No. 741,586. PATENTED OCT. 13, 1903.
F. MAURER.
EGG BEATER.
APPLICATION FILED FEB. 5, 1903.
NO MODEL.

Witnesses
C. D. Kesler
W. B. Keefer

Inventor
Fred Maurer
By James L. Norris
Atty.

No. 741,586.

Patented October 13, 1903.

UNITED STATES PATENT OFFICE.

FRED MAURER, OF CHICAGO, ILLINOIS, ASSIGNOR OF ONE-HALF TO ANNA MacCANCE, OF CHICAGO, ILLINOIS.

EGG-BEATER.

SPECIFICATION forming part of Letters Patent No. 741,586, dated October 13, 1903.

Application filed February 5, 1903. Serial No. 142,037. (No model.)

*To all whom it may concern:*

Be it known that I, FRED MAURER, a citizen of the United States, residing at Chicago, in the county of Cook and State of Illinois, have invented new and useful Improvements in Egg-Beaters, of which the following is a specification.

This invention relates to egg-beaters.

The object of the invention is to provide an egg-beater which will in a rapid, thoroughly efficient, and practical manner effect beating of eggs with perfect breaking up and admixture of the parts thereof, the mixing of dough or the thorough conglomeration of any materials desired.

With the above and other objects in view, as will appear as the nature of the invention is better understood, the same consists in the novel construction and combination of parts of an egg-beater, as will be hereinafter fully described and claimed.

In the accompanying drawings, forming a part of this specification, and in which like numerals of reference indicate corresponding parts, there is illustrated one form of embodiment of the invention capable of carrying the same into practical operation, it being understood that the elements therein exhibited may be varied or changed as to shape, proportion, and exact manner of assemblage without departing from the spirit thereof.

Figure 1:
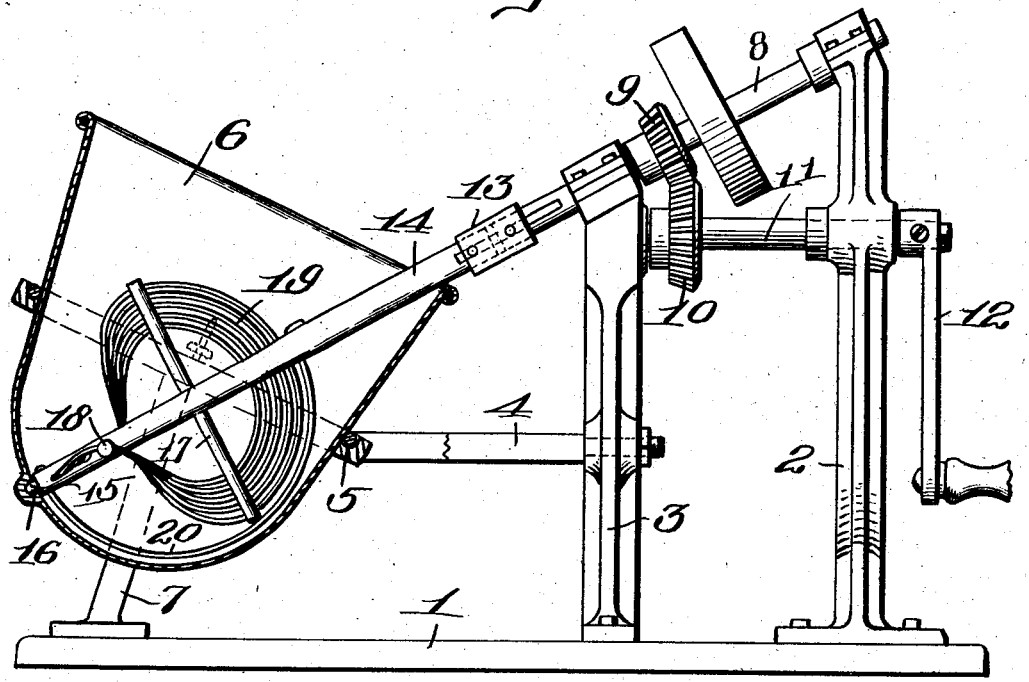
Figure 2:
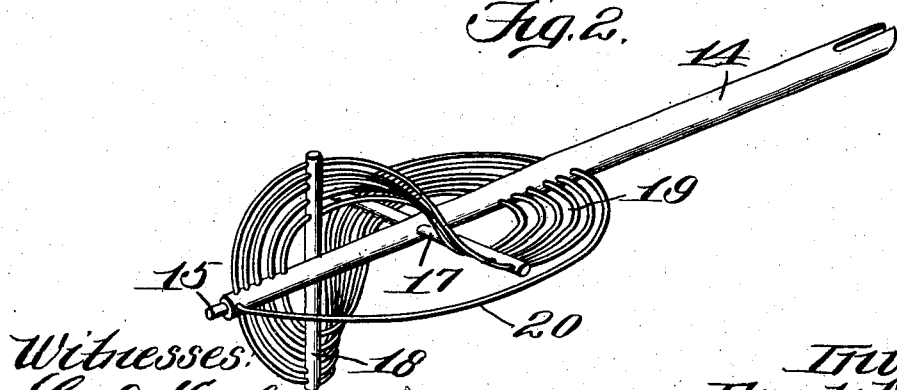

In the drawings, Figure 1 is a view in side elevation, partly in section, of an egg-beater constructed in accordance with the invention. Fig. 2 is a detail view of the beater.

Referring to the drawings, 1 designates the base of the apparatus, to which is suitably secured two standards 2 and 3, and projecting from the standard 3 is an arm 4, forming a circular seat 5, constituting a support for a receptacle 6, which may be of any preferred shape, preferably cone shape, with a rounded bottom. The seat is stayed and rendered rigid by uprights 7, suitably secured to the base.

Journaled in the upper portion of the standards is a shaft 8, which carries a bevel-gear 9, designed to be engaged by a similar gear 10, carried by a shaft 11, also journaled in the standards, the outer end of the shaft 11 being squared to receive an operating-handle 12. In very large machines this handle may be supplemented by a pulley to be driven by a belt or otherwise. The shaft 8 is disposed at an angle to the shaft 11, and its inner end, or that next to the receptacle, carries a coupling 13, designed to be interlocked in any preferred manner with the shank 14 of the beater, the lower or inner end of the said shank being provided with a stud or projection 15 to engage a socket 16 in the receptacle.

The beater, which constitutes the essential feature of the invention, comprises the aforementioned shank 14, through the lower end of which project two arms 17 and 18, disposed at right angles to each other. The agitators or beaters comprise a plurality of whip-wires 19, the peculiar arrangement of which operates in beating eggs to grasp the egg and lift it, rapidly swirling it around in the receptacle and at the same time beat it and break it, so that perfect whipping is rapidly and positively effected. These whipping-wires are passed through openings in the shank above the arm 17, thence through the said arm and through the arm 18 and through the shank below the latter arm. Those wires above the arm 18 are disposed in a plane parallel with the arm 17, then are twisted on a compound curve and passed through the arm 18 and thence through the lower end of the shank, those wires below the arm 18 being disposed in a plane approximately parallel with the latter arm. In addition to these whipping-wires there is a scraping-wire 20, which extends on a curve from a point above the upper whip-wire down to the bottom of the shank, being approximately parallel with those whip-wires above the arm 17 and at right angles to those whip-wires below the arm 18. The function of this wire 20 is to travel and impinge against the inner side of the bottom portion of the receptacle, and thus positively remove any material which adheres thereto and at the same time to pick up and admix with the other materials, in slight part thereof, that which escaped the other whip-wires. By the right-angular disposition of the portion of the whip-wires above and below the arms 17 and 18, respectively, and the peculiar curvature of the portion of the whip-wires connecting the said arms under rotation of the beater-head the material—say eggs—is beaten and mixed by those whip-wires above and below the arms, while the intermediate curved whip-wires operate to transmit a swirling or rotary motion to the material, and thus effect its positive mixing. During the rotation of the agitator-head the scraping-wire 20 operates to clear the receptacle of any material which adheres to the bottom portion thereof.

When the mixing or beating has been completed, the coupling 13 is disengaged from the shank 14, and the beater may then be lifted from the receptacle to permit the material acted upon to be removed.

The particular form of beater-actuating mechanism herein shown has been found thoroughly efficient in use; but it is to be understood that the invention is not to be limited thereto, as any other form of mechanism adapted for the purpose may be employed and still be within the scope of the invention.

Having thus described the invention, what is claimed is—

1. As a new article of manufacture, an egg-beater head comprising a shank, a pair of arms carried thereby disposed at right angles to each other, and whip-wires secured in the shank above and below the arms and in the arms, those portions of the wires above and below the arms being disposed at right angles to each other and to the shank and the intermediate portions of the wires being disposed on compound curves, and a scraping-wire extending from the upper portion of the shank to the lower portion thereof and at right angles to the lower arm.

2. An egg-beater comprising a cone-shaped receptacle provided with a rounded bottom having a socket, in combination with a beater-head disposed at an angle to the receptacle and comprising a shank having its lower end furnished with a teat to engage the socket, a pair of arms carried by the shank and disposed at right angles to each other, whip-wires secured in the shank above and below the arms and in the arms, those portions of the wires above and below the arms being disposed at right angles to each other and to the shank and the intermediate portions of the wires being disposed on compound curves, a scraper-wire extending from the upper portion of the shank to the lower portion thereof and at right angles to the lower arm and being of a contour closely to follow the inner surface of the receptacle, and means for positively driving the shank.

In testimony whereof I have hereunto set my hand in presence of two subscribing witnesses.

FRED MAURER.

Witnesses:
C. F. BORMAN,
JAMES J. HEALY.